US009266596B2

(12) United States Patent
Heppe

(10) Patent No.: US 9,266,596 B2
(45) Date of Patent: *Feb. 23, 2016

(54) ADDITIONAL SYSTEMS AND METHODS FOR LONG ENDURANCE AIRSHIP OPERATIONS USING A FREE-FLYING TETHERED AIRSHIP SYSTEM

(71) Applicant: Stephen B. Heppe, Hood River, OR (US)

(72) Inventor: Stephen B. Heppe, Hood River, OR (US)

(*) Notice: Subject to any disclaimer, the term of this patent is extended or adjusted under 35 U.S.C. 154(b) by 510 days.

This patent is subject to a terminal disclaimer.

(21) Appl. No.: 13/969,998

(22) Filed: Aug. 19, 2013

(65) Prior Publication Data
US 2014/0097289 A1   Apr. 10, 2014

Related U.S. Application Data

(63) Continuation-in-part of application No. 13/623,757, filed on Sep. 20, 2012, now Pat. No. 9,139,279, which is a continuation-in-part of application No. 13/227,966, filed on Sep. 8, 2011, now Pat. No. 8,678,309, which is a continuation-in-part of application No. 13/159,215, filed on Jun. 13, 2011, now Pat. No. 8,864,063.

(51) Int. Cl.
B64C 37/02   (2006.01)
B64B 1/00    (2006.01)
B64B 1/04    (2006.01)
B64B 1/50    (2006.01)

(52) U.S. Cl.
CPC ... *B64B 1/00* (2013.01); *B64B 1/04* (2013.01); *B64B 1/50* (2013.01); *B64C 37/02* (2013.01)

(58) Field of Classification Search
CPC .............. B64B 1/00; B64B 1/04; B64B 1/50; B64C 37/02
See application file for complete search history.

(56) References Cited

U.S. PATENT DOCUMENTS

| 1,549,061 | A | 8/1923 | Chenu |
| 1,372,924 | A | 3/1929 | Anderson |
| 1,818,138 | A | 8/1931 | Howland |
| 2,863,618 | A | 12/1958 | Doyle et al. |
| 4,082,063 | A | 4/1978 | Strickland |

(Continued)

FOREIGN PATENT DOCUMENTS

GB   2141088 A   12/1984

OTHER PUBLICATIONS

Naval Research Advisory Committe, Lighter-Than-Air Systems for Future Naval Missions, Flag Officers and Senior Executive Service, The Pentagon Auditorium, Oct. 4, 2005.
Sanswire Corporation, Unmanned Airship Solutions for Integrated ISR Systems; Technical White Paper, Jul. 24, 2007.
Graham Warwick, Higher ground: Stratospheric airships special report-Aug. 15, 2006-Washington DC-Flight International; Aug. 16, 2006.

(Continued)

*Primary Examiner* — Justin Benedik
(74) *Attorney, Agent, or Firm* — Fabian Vancott; Jeffrey K. Riddle

(57) ABSTRACT

In one example, a free-flying tethered airship system includes an upper airship adapted to tailor its lift and drag, a lower airship adapted to tailor its lift and drag, and a tether connecting the upper airship to the lower airship such that the upper airship is at least one kilometer above the lower airship. The upper airship is configured to be equiliberally buoyant, while carrying the tether, in a first altitude range. The lower airship is configured to be equiliberally buoyant in a second altitude range, the first altitude range being higher than the second altitude range. A method for stationkeeping of a free-flying tethered airship system is also provided.

11 Claims, 11 Drawing Sheets

(56) References Cited

U.S. PATENT DOCUMENTS

| | | | |
|---|---|---|---|
| 4,995,572 | A | 2/1991 | Piasecki |
| 5,857,645 | A | 1/1999 | Hodgson |
| 6,220,543 | B1 | 4/2001 | Uskolovsky |
| 6,422,506 | B1 | 7/2002 | Colby |
| 7,055,777 | B2 | 6/2006 | Colting |
| 7,708,222 | B2 | 5/2010 | Lee |
| 8,061,648 | B2 | 11/2011 | Lachenmeier |
| 2004/0195431 | A1 | 10/2004 | Yumlu et al. |
| 2008/0179453 | A1 | 7/2008 | Thompson |
| 2008/0265086 | A1 | 10/2008 | Lee |
| 2012/0234965 | A1 | 9/2012 | Heppe |
| 2012/0312919 | A1 | 12/2012 | Heppe |

OTHER PUBLICATIONS

Mitre, 12 Miles High; an Integrated Airship-Radar is on the Horizon, Mar. 15, 2010.

Craig L. Nickol et al., High Altitude Long Endurance UAV Analysis of Alternatives and Technology Requirements Development, NASA/TP-2007-214861; Mar. 2007.

George D. Modica et al., an Investigation of Stratospheric Winds in Support of the High Altitude Airship, Atmospheric and Environmental Research, Inc., Lexington, Massachusetts Systems Technology, Inc., Hawthorne, California; Sep. 21, 2010.

JP Aerospace, Something new at the boundary of Earth and space; Tandem Class Airships, http://www.jpaerospace.com/Tandem/tandem.html[Nov. 20, 2010 4:50:26 PM].

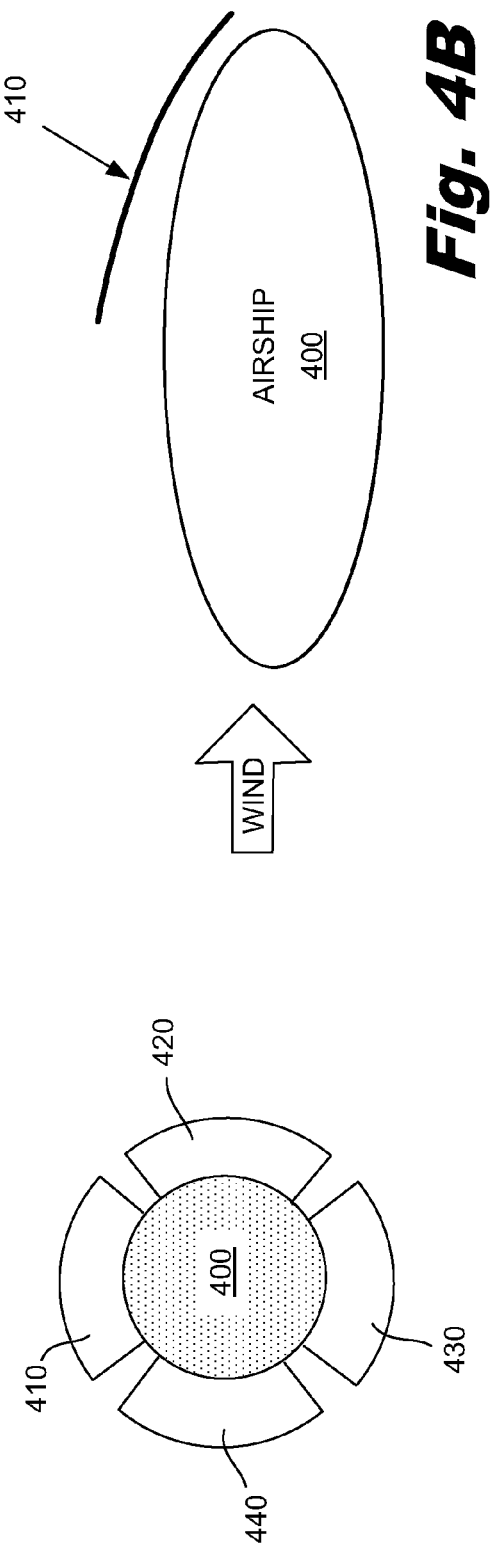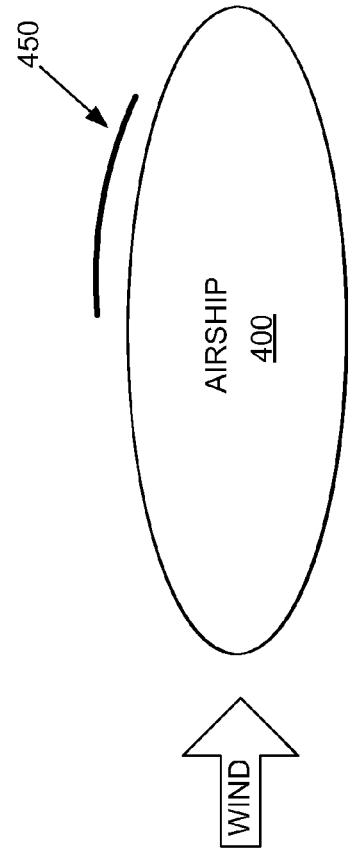

ADDITIONAL SYSTEMS AND METHODS FOR LONG ENDURANCE AIRSHIP OPERATIONS USING A FREE-FLYING TETHERED AIRSHIP SYSTEM

RELATED APPLICATIONS

The present application is a continuation-in-part and claims the benefit under 35 U.S.C. §120 of U.S. application Ser. No. 13/623,757, filed Sep. 9, 2012, entitled "Systems and Methods for Long Endurance Airship Operations," which is a continuation-in-part and claims the benefit under 35 U.S.C. §120 of U.S. application Ser. No. 13/227,966, filed Sep. 8, 2011, entitled "Lifting Gas Replenishment in a Tethered Airship System," which is a continuation-in-part of U.S. application Ser. No. 13/159,215, filed Jun. 13, 2011, entitled "Tethered Airships." These applications are hereby incorporated by reference in their entireties.

The present application also incorporates by reference, in their entirety, the following applications:

a) U.S. application Ser. No. 13/048,625, filed Mar. 15, 2011, entitled "Systems and Methods for Long Endurance Airship Operations."

b) U.S. application Ser. No. 13/228,212, filed Sep. 8, 2011, entitled "Systems and Methods for Long Endurance Airship Operations."

c) U.S. application Ser. No. 13/347,371, filed Jan. 10, 2012, entitled "Airship Launch from a Cargo Airship."

d) U.S. Prov. Application No. 61/563,187, filed Nov. 23, 2011, entitled "Durable Airship Hull and in situ Airship Hull Repair."

e) U.S. application Ser. No. 13/677,046, filed Nov. 12, 2012, entitled "Durable Airship Hull am in situ Airship Hull Repair."

f) International App. No. PCT/US2013/021034, filed Jan. 10, 2013, entitled "Airship Launch from a Cargo Airship."

g) International App. No. PCT/US2012/028931, filed Mar. 13, 2012, entitled "Systems and Methods for Long Endurance Airship Operations."

BACKGROUND

There is a recognized need for long endurance aeronautical operations that can, for example, provide persistent surveillance, maintain a communication link, or make in situ science measurements over an extended period of time comprising weeks, months or every years. However, current aircraft have limited endurance. Consequently, extended aeronautical operations typically involve cycling through multiple aircraft. Specifically, while one or more aircraft is/are performing the intended mission, one or more other aircraft is/are being refueled and possibly refurbished. This can be both expensive and hazardous. The takeoff and landing of aircraft are typically the highest risk portions of a mission, and each takeoff and landing increases the risk of damage or loss of the aircraft and payload. This is particularly true for lighter-than-air aircraft that tend to be large and relatively slow-moving. As a consequence, there is a need to reduce the cost and risk of extended aeronautical operations.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 4A-4C show examples of airships with one or more integrated deflection surfaces on an outer hull surface, according to one example of principles described herein.

Throughout the drawings, identical reference numbers designate similar, but not necessarily identical, elements.

DETAILED DESCRIPTION

Figure 1:
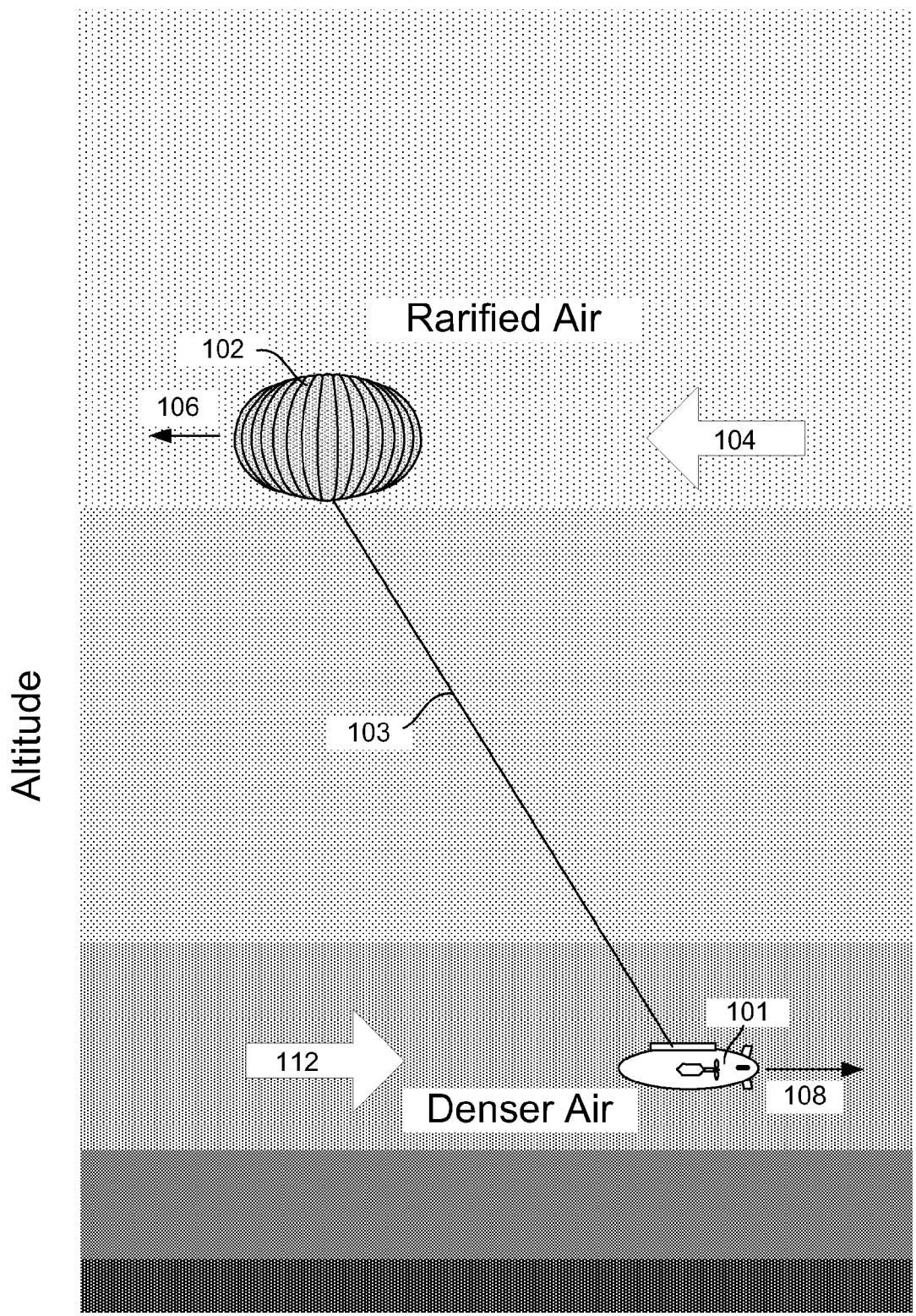
FIG. 1 is a diagram of a free-flying tethered airship system comprising an upper and lower airship attached by a tether, with countervailing winds at the different altitudes occupied by the upper and lower airship, according to one example of principles described herein.

There is a recognized need for long-endurance aeronautical operations. Desirable missions include low-altitude or tropospheric radio relay, high-altitude or stratospheric radio relay (aircraft supporting this mission are sometimes called "stratsats"), low-altitude surveillance, high-altitude surveillance, signals intercept, and in situ atmospheric observations, among others. Many of these missions could, conceivably, persist for months or years. For example, an operator of a stratospheric radio relay might desire a single aircraft to remain on-station for years (if such a feat were possible) in order to maximize return on investment and minimize the chance for loss of (or damage to) the aircraft during launch, recovery, and low-altitude operations. Barring the availability of an aircraft that can remain aloft indefinitely while performing a useful mission, an operator might be forced to rely on multiple aircraft that are "cycled" in such a way that one aircraft is always "on station" performing its mission. A counter-piracy surveillance mission could also benefit from a long-endurance aircraft that could remain aloft and on-station, performing its mission for months or years (or indefinitely).

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

According to one aspect of the principles described herein, a free-flying tethered airship system includes a tether connecting a payload airship and a first logistics airship, or a first logistics airship and a second logistics airship (which may also be mated to a payload airship). The first logistics airship is configured to be equiliberally buoyant, while carrying the tether, in a first altitude range and the payload airship with its payload, or second logistics airship (or combination of second logistics airship and payload airship with its payload) is configured to be equiliberally buoyant in a second altitude range. In one embodiment, the first altitude range is higher than the second altitude range, such that the first logistics airship is at least one kilometer above the other airship or airships and the tether mechanically transmits drag forces and lift forces between the airships, in such an embodiment, the first logistics airship may be termed an "upper airship" and the payload airship, second logistics airship, or combination of second logistics airship and payload airship, may be termed a "lower airship". Note that, for simplicity of discussion, the "lower airship" may refer to one or a plurality of airship. In some embodiments, the first altitude range is between 20 and 50 kilometers above sea level and the second altitude range is between 10 and 30 kilometers above sea level. Optionally, a balloon shuttle may be included in the system. The balloon shuttle is configured to travel up the tether toward the first logistics airship carrying a payload of lifting gas from the lower airship. The payload airship or second logistics airship attached to the lower end of the tether includes a supply of lifting gas for transfer to the balloon shuttle. In some embodiments, the lower airship is configured to receive replenishment from a ground station, the replenishment comprising at least one of fuel, lifting gas, and new payloads. This replenishment may be received in a variety of ways, including using another logistics airship to shuttle the replenishment up to the lower airship. In one implementation, a lower end of the tether is attached to the payload airship and a second logistics airship is mated to the payload airship. Alternatively, the tower end of the tether may be attached to the second logistics airship and the payload airship is mated to the second logistics airship.

The free-flying tethered airship system may include an upper airship at a first altitude and a lower airship at a second altitude, the upper and lower airships being connected by a tether, in which the first altitude and second altitude are stratospheric altitudes that are vertically separated by at least five kilometers. Maintaining stationkeeping at the station includes altering the aerodynamic characteristics of at least one of the airships to improve the stationkeeping performance of the system. This may be done in a variety of ways. When the winds at the first altitude and winds at the second altitude are traveling in substantially different directions, altering the aerodynamic characteristics of the combined airship may include at least one of: altering the heading of one of the airships, deploying a drogue chute, altering aerodynamic characteristics of the drogue chute, deploying a parafoil, altering the aerodynamic characteristics of the parafoil, changing at least one of the first altitude and the second altitude, or other suitable change, such as altering the attachment point of the tether or altering the attitude (e.g., angle of attack) of one or more of the airships.

FIG. 1 illustrates a free flying tethered airship system that includes a lower airship 101, an upper airship 102 and a tether 103 connecting the lower airship 101 to the upper airship 102. The tower airship 101 operates in much denser air than the upper airship 102. For example, the lower airship 101 may operate at altitudes of 15-20 kilometers, with an air density in the range of approximately 100 to 200 grams/meter$^3$ and the upper airship 102 may operate at altitudes of 27-37 kilometers with an air density in the range of approximately 6 to 30 grams/meter$^3$. The upper airship 102 is designed to operate at a higher altitude than the lower airship 101, while carrying the full weight of the tether 103. The upper airship 102 is sufficiently buoyant to carry its own weight and the weight of the tether 103. In some embodiments, the tether 103 is very long—possibly in excess of 20 km. It is designed to carry its own weight without snapping, as well as sustain the tensile loads placed on the tether 103 by the two airships 101, 102 and the drag forces induced by the winds 104, 112.

Both the upper airship 102 and the lower airship 101 may include a variety of propulsion and variable drag/lift elements to tailor their lift and drag. In this illustration, only the lower airship is shown with propulsion capabilities and variable drag/lift elements are not specifically shown.

The presence of countervailing winds at different altitudes can be used to reduce the amount of fuel needed for stationkeeping. In the example shown in FIG. 1, the upper airship 102 is subjected to wind 104 traveling to the left which results in a drag force 106. The lower airship 101 is subjected to winds 112 traveling the opposite direction (to the right) which results in drag force 108 to the right. The tether 103 connects the upper and lower airships 101, 102 so that the forces on the overall airship system can fully or partially cancel each other. A variety of adjustments can be made to the system to adjust the drag forces 106, 108 so that they tend to cancel each other out. These adjustments including deployment of variable drag/lift elements, changing altitude, changing the angle of attack of the airships, and other techniques.

In this embodiment, one of the airships may carry a payload and be designated as the payload airship and the other airship may be a logistics airship that supports the payload airship. For example, the upper airship 102 may be the logistics airship and the lower airship 101 may be the payload airship. The upper airship 102 supports the lower payload airship 101 by providing stationkeeping forces through the tether. This reduces the amount of fuel that the lower payload airship uses for stationkeeping. This allows for significantly longer free flight missions (in the range of years) without returning the airship system to the earth.

FIG. 1 is only a cartoon illustrating the principles described herein. The elements in FIG. 1 are not necessarily to absolute or relative scale. Further, the elements illustrated may have a variety of different configurations. For example, the upper airship may be a pumpkin lobed balloon as illustrated or have a more elongated dirigible shape.

Scavenging and Purification of Gases

One challenge for long duration flight of airships using lifting gas is the loss or contamination of lifting gas. This decreases the buoyancy of the airship over time and can significantly reduce its lifting capacity. The loss of lifting gas may be due to the lifting gas diffusing through an undamaged membrane or escaping through a compromised membrane. FIG. 2A illustrates in schematic form an airship 200 with outer hull 202 and multiple internal ballonets (210, 220, 230, 240, 250, 260, 270) for lifting gas. Also shown is a longitudinal plenum or hollow passageway 205 running the length of the airship, along its axis, passing through each of the ballonets. This hollow passageway 205 allows for physical communication between the ballonets, allowing a robotic device to move among them, and also allows for the transfer of lifting gas between ballonets via suitable valves and pumps communicating with it. In this illustrated embodiment, the space 207 between the ballonets, and between the ballonets and the outer hull 200, is substantially filled with atmospheric gases although some lifting gas may be present due to leakage from the ballonets.

FIG. 2B is a detail view showing a gas separator 295 mounted on or in the hollow passageway 205. The gas separator 295 can directly access the mixture of gases in the space 207 between the ballonets (and between the ballonets and the outer hull). The gas separator 295 is adapted to separate and isolate the lifting gas from the mixture of gases in the space 207, and transfer or inject the lifting gas into the hollow passageway 205. In this way, lifting gas is "scavenged" from the airspace inside the outer hull 200, thereby minimizing loss of lifting gas through the outer hull and to the outer atmosphere. A variety of different methods for separating the lifting gas from the atmospheric gases can be used, including methods using membranes, ceramics, and electrochemical techniques. Other methods that may be developed in the future could also potentially be used. While the gas separator 295 is shown as mounted on the hollow passageway 205, other mounting locations are possible (such as e.g. the outer hull 200, with suitable connections to the hollow passageway 205 or the ballonets themselves), as will be apparent to those of skill in the art.

Using currently-known methods, the gas separator would represent a weight and power penalty for the airship. This has an impact on the overall size and cost of the airship. From a system design standpoint, a designer can trade-off this penalty against an alternative that simply resupplies hydrogen from an external source (such as the balloon resupply method disclosed in various documents incorporated by reference).

In one embodiment, a gas separator is installed on an airship but left unused except during (and immediately following) a period of significant leakage of lifting gas from one or more of the ballonets. This can minimize the power penalty associated with operating the gas separator, and preserve overall airship performance while an outer hull leak is being repaired, and prior to resupply of lifting gas from an external source.

It is also possible to scavenge atmospheric gases from the ballonets of lifting gas, thereby preserving the purity of the gases inside the ballonets. For example, a cold plate inside a ballonet can capture carbon dioxide, nitrogen and oxygen while leaving hydrogen in a gaseous state. Other methods are also feasible. Hatchways 280 and valves 290 are one method of communication between the ballonets and the hollow passageway 205.

Additional Designs of Inner and Outer Hulls and Ballonets

Figure 2:
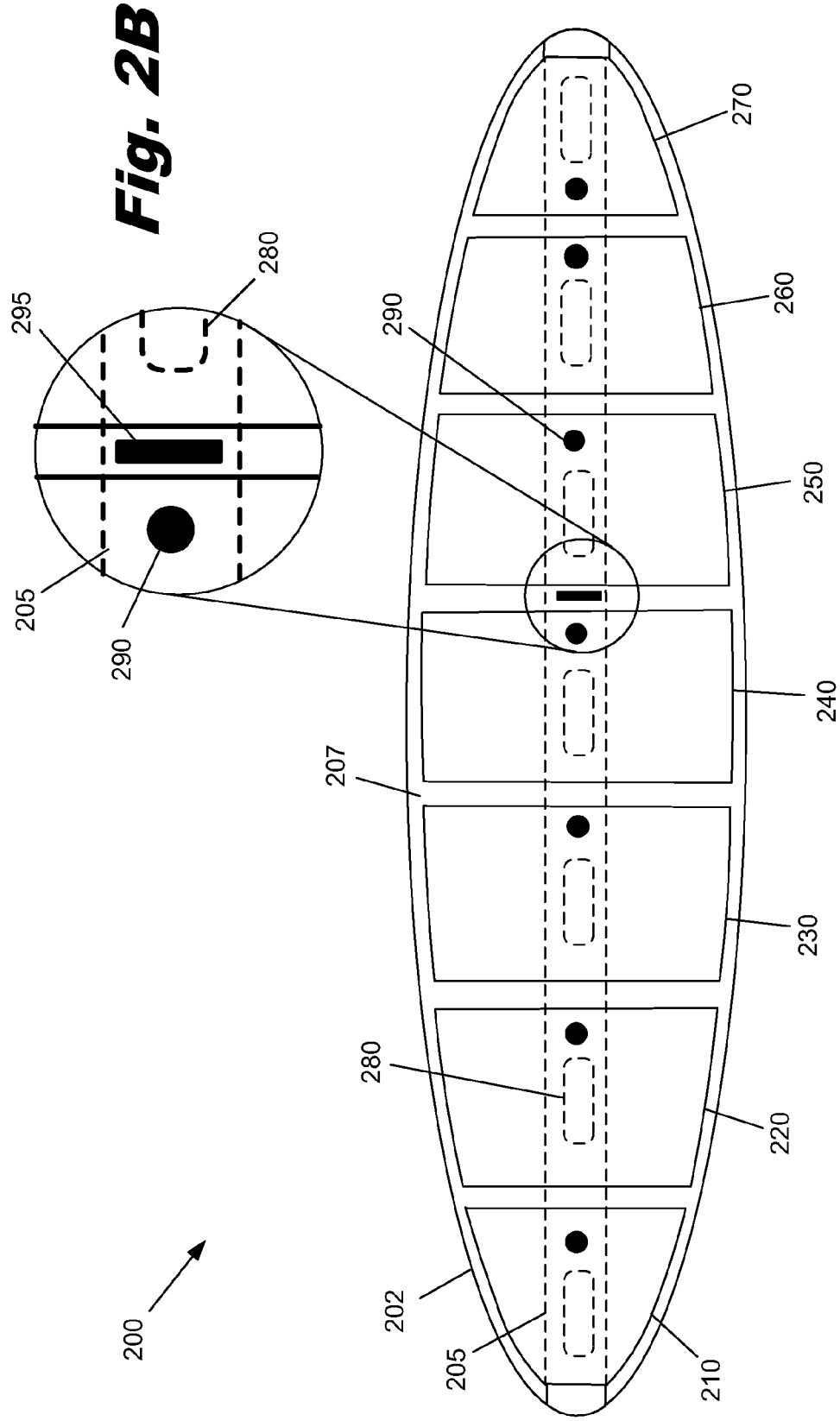
FIGS. 2A and 2B are schematic diagrams of an airship with an outer hull and multiple internal ballonets for lifting gas, according to one example of principles described herein.
Figure 3:
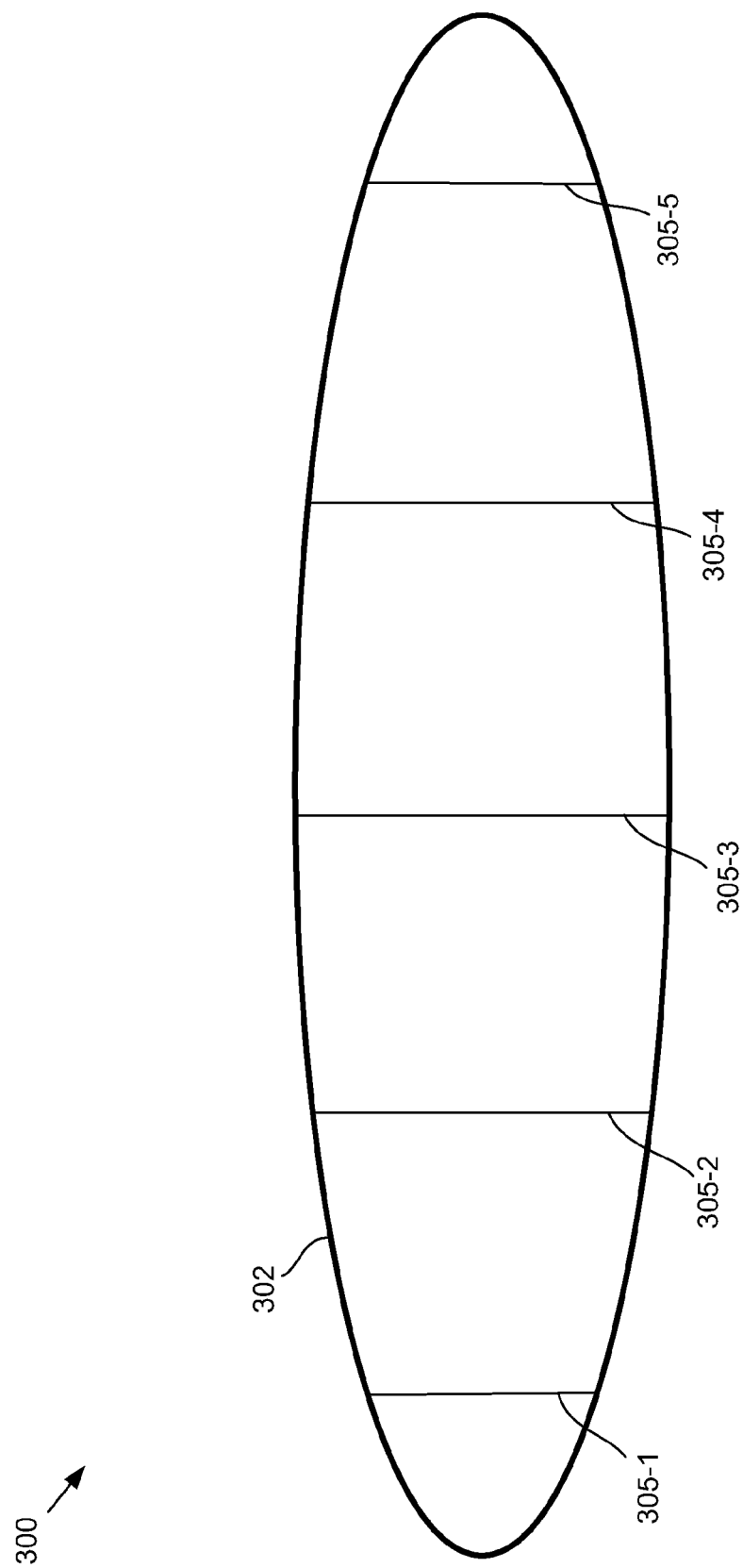
FIG. 3 is a schematic diagram of an airship with a hull and a plurality of bulkheads separating the internal volume of the hull, according to one example of principles described herein.

FIG. 3 illustrates in schematic form a hull, 302, that makes up an aggregate lifting volume for airship 300, and a plurality of membranes or bulkheads 305. The hull 300 could represent a single-hull airship, or the inner hull in a dual-hull airship. The bulkheads 305 divide the aggregate lifting volume into a plurality of distinct lifting cells. In comparison to a system with multiple distinct and separate ballonets, as illustrated previously in FIG. 2, this approach reduces total weight since adjoining lifting cells share a common bulkhead.

In order to facilitate the shifting of lifting gas among the various distinct lifting cells, the bulkheads can optionally be designed with excess material (slack). This can allow lifting gas to be moved from one cell to another cell. By moving lifting gas from cell to cell, leakage can be minimized and the attitude of the airship can be adjusted. For example, if one cell has a significant leak, at least a portion of the remaining lifting gas in the leaking cell can be moved to different cells. The slack in the bulkhead allows for the other cells to expand their capacity without undesirably increasing their internal pressure. In another example, if the location of payload or other mass is shifted or more mass added, the weight distribution within the airship may change, which could affect the untrimmed attitude of the airship and therefore its aerodynamic characteristics. This can be compensated for by pumping lifting gas from one cell to another cell.

Additional Systems and Methods for Adjustment of Drag and Lift

FIGS. 4A-4C illustrates a deflection surface, using flexible materials or fabrics, integrated with an airship 400. The deflection surface creates a duct between the deflection surface and an outer hull surface of the airship 400 on which it is mounted. The duct can be opened at its leading edge, and may be open or closed at its sides and rear. FIG. 4A is a front view showing four deflection surfaces 410, 420, 430, 440 (and associated ducts) symmetrically arranged around an airship 400. FIG. 4B is a cross-sectional side view of the airship 400 showing one deflection surface 410 in relation to the airship on which it is mounted. A variety of mounting and control hardware can be used in conjunction with the deflection surfaces. For purposes of presentation this mounting and control hardware is not shown in the figures. FIG. 4C is a cross-section side view of the airship 400 that shows a deflection surface (450) that is shorter and does not extend as far to the rear of the airship (400).

Each of the deflection surfaces 410, 420, 430 and 440 can be operated in a closed position, where it is effectively coincident with the surface of the airship 400, or an open position (as shown for deflection surface 410 in FIG. 4B), or a partially-open position. If an opposing pair of deflection surfaces is opened to an equal extent, and the airship is oriented directly into the wind, a pure drag force is generated. Alternatively, in the configuration illustrated in FIG. 4B (where only an upper deflection surface 410 is opened, and the other three (not shown) are assumed to be flush with the surface of the airship), an asymmetric force is generated. In the configuration illustrated in FIG. 4B, where the duct is open at its trailing edge, a combination of lift and drag is generated. Also in this configuration, whether the trailing edge is open or closed, there is a torque tending to increase the airship's angle of attack (since the deflection panel as illustrated in FIG. 4B is on the upper side of the airship and acts as an elevator), and the resulting airship orientation also tends to increase lift and drag.

FIG. 4C shows a shorter deflection surface 450 connected to an upper surface of the airship 400. The exhaust gases from the duct associated with this shorter deflection surface (450) will interact less strongly with the exhaust gases of similar ducts symmetrically arranged, as compared to exhaust gases associated with ducts that extended further toward the rear of the airship as illustrated in FIG. 4B. Also, the shorter deflection surface 450 may be lighter and easier to control than the larger deflection surfaces, yet provide sufficient aerodynamic force to satisfy the control objectives of the system. In general, deflection surfaces may be any surface that is connected to an airship and is designed to provide a route for air to flow or be captured between the deflection surface and the hull of the airship. Deflection surfaces may be controlled or have a static configuration. The deflection surfaces may have any desired shape or size and may be used to control and/or influence pitch, roll, yaw, overall drag, translation forces, and altitude. In many instances, the use of one or more deflection surfaces may simultaneously influence a combination of the listed parameters. The deflection surfaces may be controlled in any of a number of ways, including control lines, resilient members, inflatable sections, or other methods.

In one embodiment, only an upper or lower deflection surface is provided depending on whether the airship is an upper airship or a tower airship, respectively. In another embodiment, three deflection surfaces are provided with the three surfaces comprising left and right (lateral) surfaces, and either an upper surface or a tower surface depending on whether the airship is an upper airship or a tower airship, respectively.

An airship, with one or several deflection surfaces as illustrated in FIG. 4, can also be equipped with a parachute or parafoil (or both), as previously described, attached to the airship or spaced along an associated tether.

Figure 5:
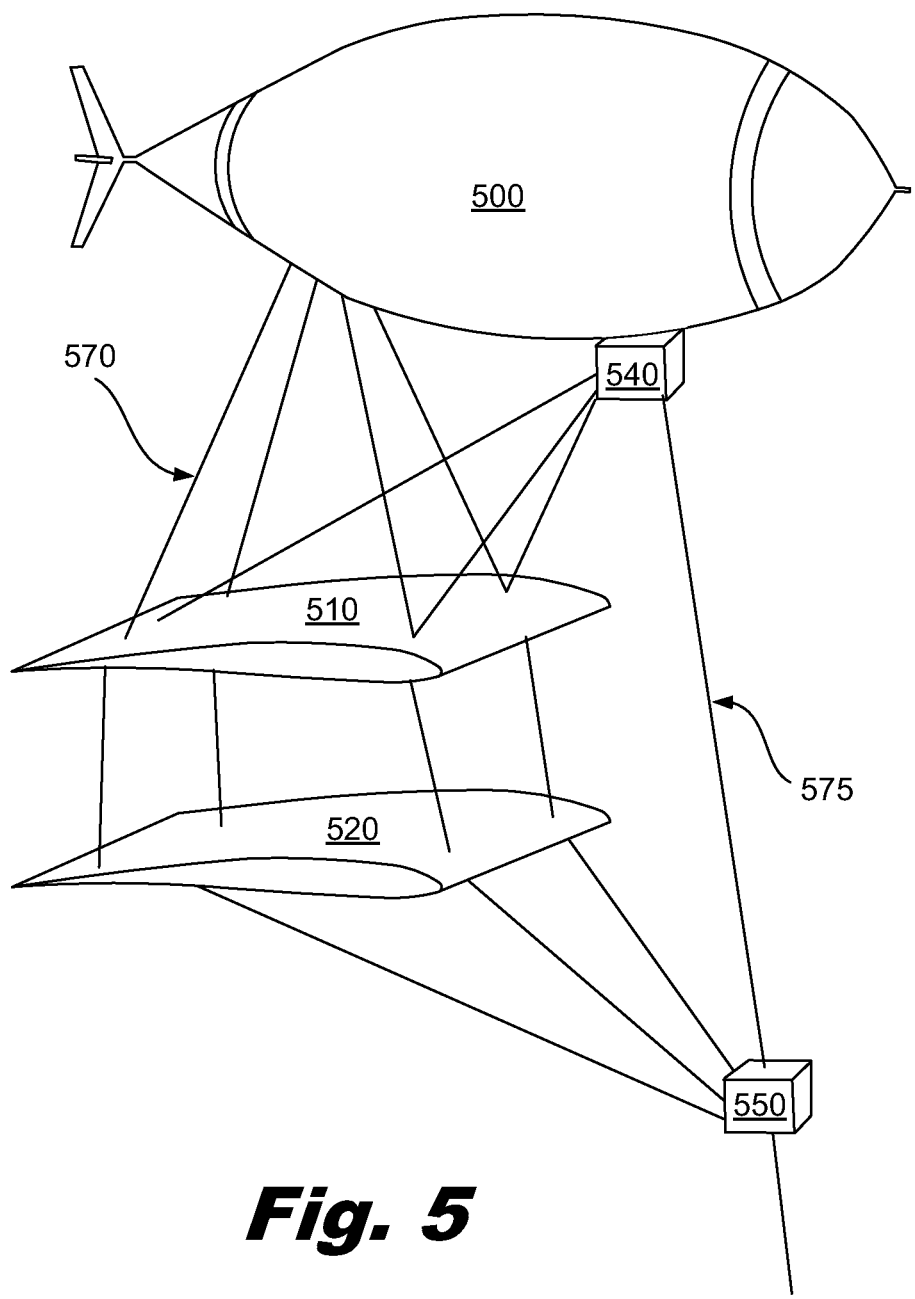
FIG. 5 is perspective diagram of a pair of distinct and non-continuous lifting surfaces suspended below an airship, according to one example of principles described herein.

Previous applications by the inventor, incorporated by reference, have described airships with an associated parafoil for generation of lift (although drag is also generated) and an associated parachute for generation of drag. These systems can be duplicated—for example using a plurality of parafoils and/or parachutes spaced along a tether, or variously attached to the tether as well as the airship itself. An illustrative example is shown in FIG. 5 where a pair of distinct and non-continuous lifting surfaces 510 and 520 (shown as rigid or semi-rigid, but not intended to exclude parafoils) is shown suspended below an airship 500. These lifting surfaces are controlled by control subsystems 540 and 550, respectively, attached to the airship 500 and spaced along the tether 575. A third control subsystem, not shown, is located at the rear of the airship and controls the additional suspension lines 570 between the airship 500 and the upper lifting surface 510. By cooperatively changing the lengths of the control and suspension lines 570, the angle of attack and bank angle of the lifting surfaces can be adjusted. The elements shown in FIG. 5 and the other drawings are not necessarily to absolute or relative scale. For example, the airship 500 has been drawn significantly smaller than it would be in an operational system. The controls 540, 550 have been drawn significantly larger than they would be in an operation system. Varying the scale of various elements allows for all the elements to be illustrated and the relationships between the elements shown.

The upper airship may be a body of revolution or may be a "lifting body" with some nominal amount of lift (i.e., greater than zero) at the angle of attack that minimizes drag. In a tethered airship system, the upper airship can take advantage of a lifting body geometry to provide some nominal lift greater than zero) at the angle of attack that minimizes drag, thereby reducing the size of the parafoil associated with that airship. For the lower airship, an inverted lifting body geometry can be used (i.e., providing a downward force).

Additional Deployment Methods

In an embodiment where a lower airship or a cargo/logistics airship serves as a carrier airship and is required to transport an upper-atmosphere airship and deploy it at an intermediate altitude, and where the tower airship or cargo/logistics airship comprises a longitudinal passageway as illustrated in FIG. 2, a convenient storage location for the un-inflated or substantially un-inflated upper-atmosphere airship is the longitudinal passageway.

In a system using such a storage and deployment method, the upper-atmosphere airship is stowed in the longitudinal passageway prior to launch. Excluding gas movements needed to manage internal pressure during the climb to altitude, all vents and pumps between the passageway and the ballonets are closed and powered-down prior to deployment in order to prevent loss of lifting gas during the deployment operation, and also to avoid damage to the upper-atmosphere airship. An airtight endcap, with a pump/valve contained therein, is provided at one end of the longitudinal passageway. An airtight "sock" or lining is also provided within the passageway, extending along at least a portion of the passageway, with its open end sealed to the watts of the passageway around the airtight endcap. Additional frangible or releasable attachment points, adapted to secure the sock or lining along the length of the passageway, may optionally be provided. The stowed upper-atmosphere airship is located within this sock or lining. Following launch, and upon achieving the desired deployment attitude for the upper-atmosphere airship, the endcap is opened and a drogue chute extracts the upper-atmosphere airship from die passageway (and the airtight sock or lining thereof) while the carrier airship maintains a suitable airspeed to enable proper operation of the drogue, and deployment. Following deployment, the airtight endcap is closed and sealed. The pump/valve is then operated to extract the ambient air from the sock or lining white the vents spaced along the length of the passageway, outside the lining, allow lifting gas to fill the passageway as the sock or lining is sucked up against the endcap. If frangible attachment points were included in the design, they may break away. Similarly, if releasable attachment points are used, they may be commanded to be released prior to extraction of the ambient air from the sock or lining, and filling of the passageway with lifting gas. Upon completion of this process, the sock or lining is compressed tightly against the endcap and the passageway can serve as a plenum between and among the ballonets or cells with which it communicates, or is connected to, through the aforementioned vents and pumps. The passageway is also substantially clear of obstruction, and can be used for the movement of a robotic device between and among the ballonets or lifting cells.

In another embodiment, the sock or lining is not substantially restrained inside the passageway, except for its open end which is sealed to the walls of the passageway around the airtight endcap as described above. However, its closed end is attached to a retraction line and a reel/take-up mechanism located at the opposite end of the passageway from the airtight endcap, said retraction line having a length at least as tong as the length of the passageway. In operation, because the sock or lining is not substantially restrained inside the passageway, it can be extracted along with the upper-atmosphere airship during the deployment sequence (although it is possibly turned inside-out as the upper atmosphere airship is deployed). In this embodiment, the sock or lining serves as an additional "scuff guard" adapted to protect the upper atmosphere airship from damage as it slides through the passageway during deployment. In order to facilitate deployment, lifting gas may be vented into the space between the walls of the passageway and the sock or lining. After the upper atmosphere airship is deployed, the retraction line is retracted to pull the sock or lining completely back into the passageway white simultaneously pumping lifting gas out of the passageway. The endcap is closed and sealed as before, the retraction line is severed close to its attachment point on the sock or lining (i.e., without puncturing the sock or lining itself), and the atmospheric gases are evacuated (and the passageway is filled with lifting gas) as previously described.

Additional Accommodations for Volume Changes as a Function of Altitude

FIG. 2 illustrated an airship with an outer hull and multiple ballonets containing lifting gas. At a low altitude, the ballonets will be relatively small but the outer hull can be kept taut by maintaining a slight overpressure of atmospheric gases in the spaces between the ballonets and the outer hull. As the airship rises, atmospheric gases can be vented to allow the ballonets to expand without endangering the integrity of the outer hull. This prevents the outer hull from becoming slack. An outer hull with a significant amount of slack may be difficult to control and have unpredictable interaction with the surrounding air. Additionally, loose flaps of material may flap in wind currents, leading to damage.

It is also possible to reverse the contents of some or all of the ballonets and the outer hull, filling the outer hull with a lifting gas and filling the ballonets with atmospheric gases.

Figure 6A:
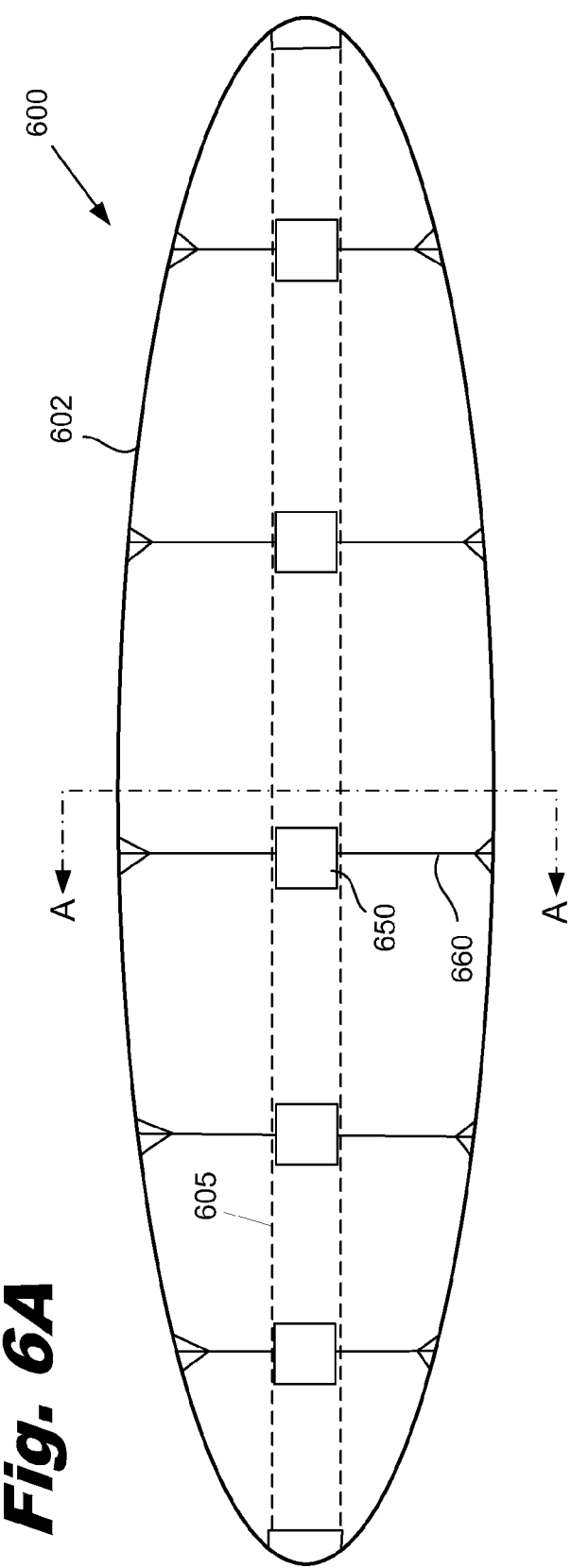
FIGS. 6A-6C are diagrams of systems for maintaining a taut outer hull by changing the hull geometry, according to one example of principles described herein.
Figure 6C:
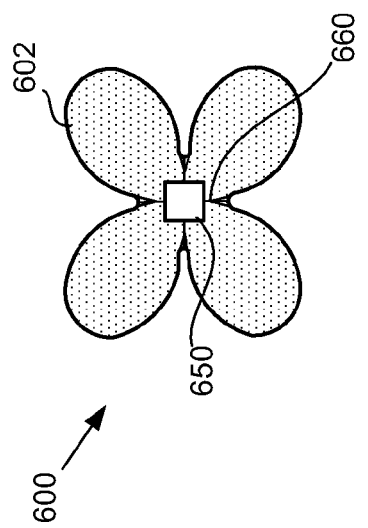
Figure 6B:
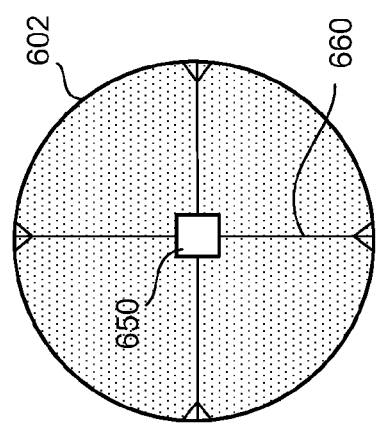

FIG. 6A shows another method to maintain a taut outer hull of an airship 600 by changing its geometry. This embodiment uses a plurality of tension structures or tension lines 660 attached to the outer hull 600, and controlled by control boxes 650 spaced along a longitudinal passageway 605, to change the cross-sectional geometry of the outer hull 600. In this figure, substantially vertical tension lines 660 are shown and substantially horizontal tension lines (i.e., running "in and out of the page") are not shown but are presumed to be present. Cross sectional views of the expanded and contracted cross-section of the airship 600 are shown in FIGS. 6B and 6C, respectively. This concept can be integrated with the multiple-ballonet airship embodiment illustrated in FIG. 2 or with other airship configurations.

In FIG. 6B, the airship hull 602 has a circular cross section with four tension lines/structures 660 extending from the central control box 650. In this configuration, the tension lines 660 do not exert substantial forces on the airship hull 602. The configuration in FIG. 6B may be used, for example, at the operational altitude of the airship.

In FIG. 6C, the tension lines have been shortened or retracted into the control box 650. This pulls the portions of the hull toward the control box and deforms the hull 602. The interior volume of the airship is significantly reduced. In this case there are four tension lines and the shape of the contracted hull has four lobes. This configuration may be used at tower altitudes to prevent slack or wrinkling in the hull of the airship. Slack in the airship hull may result in a loss of structure and aerodynamic control of the airship. Slack portions may also flap in the airflow, causing damage to the hull material. Additionally, or alternatively, the contracted configuration shown in FIG. 6C may be used to increase drag produced by airflow over the hull.

Figure 6D:
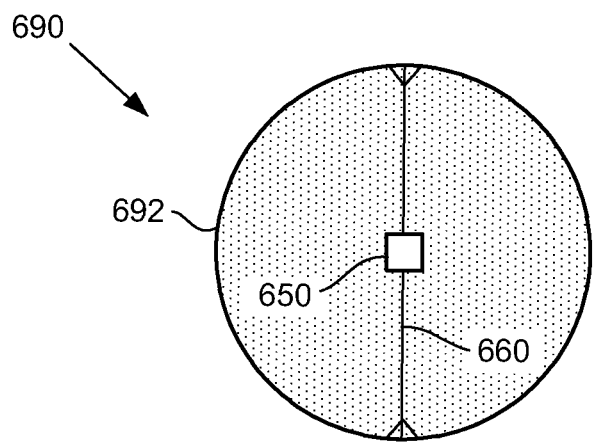
FIGS. 6D-6E are diagrams of systems for maintaining a taut outer hull on a lobed airship by changing the hull geometry, according to one example of principles described herein.
Figure 6E:
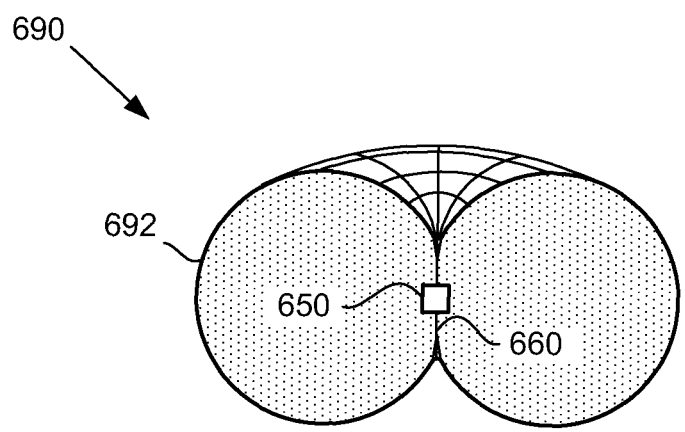

FIGS. 6D and 6E are cross sections that show, for an embodiment comprising a substantially spherical airship, a "pole pull" technique which pulls two antipodal points on the airship toward each other. FIG. 6D shows a spherical airship 690 that includes a hull 692, two tension members 660 connected to two opposing points on the hull, and a control box 650. FIG. 6D shows the spherical airship in a fully inflated configuration with the pressure of the lifting gas on the interior placing the spherical hull in tension. This configuration is typical at the operational altitude of the airship where the external air pressure is low and volume of the lifting gas is large.

When the tension members 660 are pulled into the control box 650, the spherical hull 692 will be distorted into a toroidal shape as shown in FIG. 6E. This can reduce internal volume by approximately 50% (i.e., if the two points are actually pulled to a common point at the center of the airship). As discussed above, this can prevent undesirable slack in the airship hull 692 and be used for aerodynamic control.

Additional Methods for Stationkeeping

Figure 7:
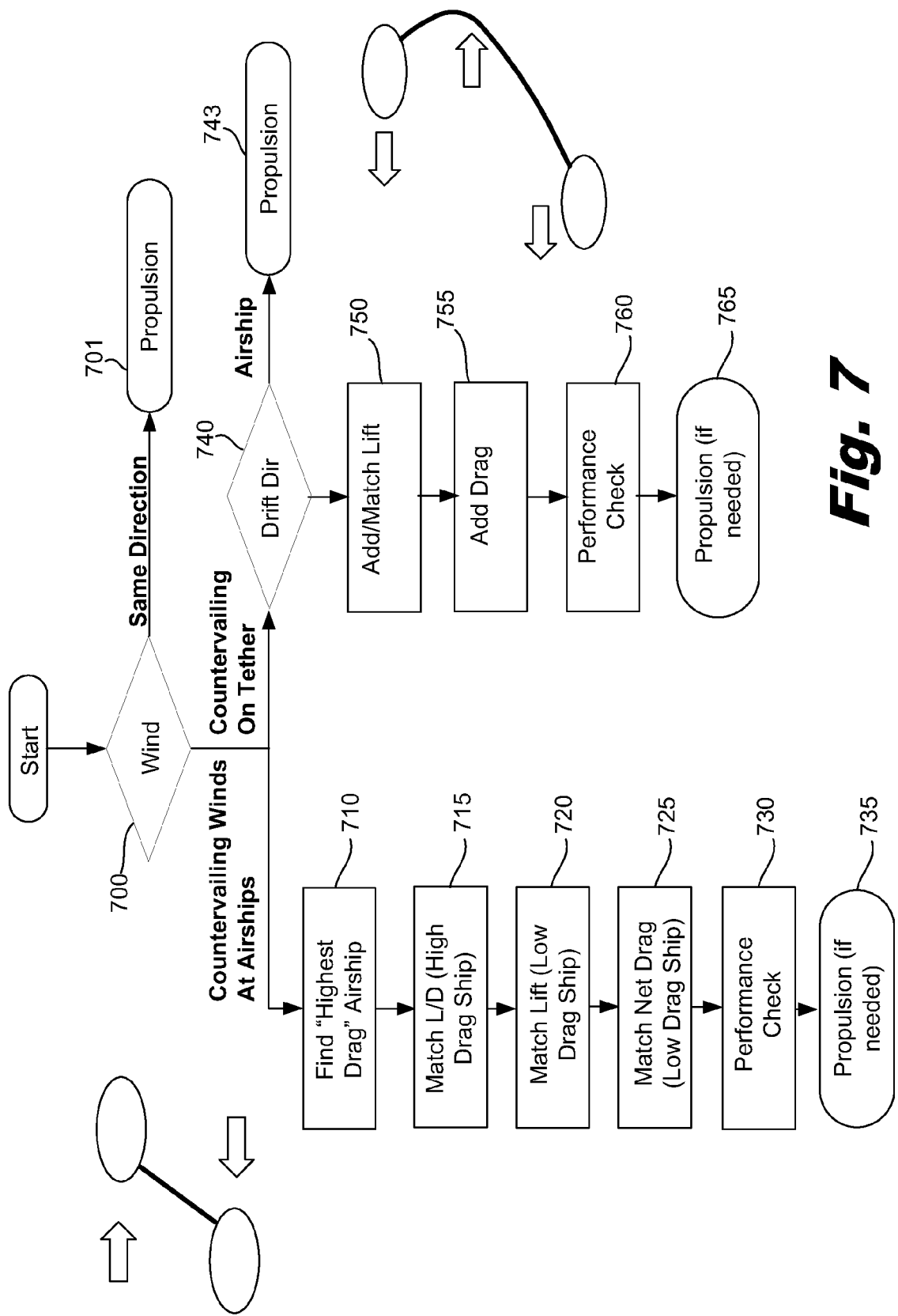
FIG. 7 is a flowchart of an illustrative method for station-keeping of a free-flying airship system, according to one example of principles described herein.

An algorithm for equalizing lift and drag, between an upper and lower airship in a free-flying tethered airship system, at a selected pair of operating altitudes for the upper airship and lower airship, is illustrated in FIG. 7. For this algorithm, it is assumed that each airship can tailor its lift and drag within defined limits. For example, each airship might be equipped with an adjustable parachute and an adjustable parafoil, and each airship can also control its angle of attack (and heading angle into the wind) so as to alter at least the lift and drag forces experienced by the system. Control parameters for this illustrative stationkeeping algorithm are airship angle of attack (AoA), parafoil AoA, and parachute size. AoA is measured with respect to the air mass (the wind direction). Those of skill will appreciate that these control parameters can be adapted to account for systems that use other methods for adjusting lift and drag, and additional control parameters could be added.

For this example, only the east-west wind is considered, the airships are assumed to have a constant volume and geometry (perhaps not the same as each other), and each airship is assumed to be equipped with one parachute and one parafoil. The parafoils are assumed to have a constant area (again, perhaps not the same as each other). The lift and drag on each airship and parafoil is assumed to be a known function of its AoA. The drag associated with each parachute is assumed to be a known function of its variable aperture (alternatively, a fixed aperture parachute could be employed with vents that can be controllably adjusted to modify the drag generated by the parachute).

In this algorithm, the first step at 700 is to check for countervailing winds (i.e., drag forces). If winds are such that the drag on both airships, and the tether, are all in the same direction, there are no countervailing forces and stationkeeping must be performed using the propulsion system alone (if within its capability). This is indicated at step 701. If stationkeeping cannot be performed using propulsion alone (or if the energy cost is considered excessive), an altitude change could be considered using e.g. the methods described previously.

If countervailing winds are available, step 700 also determines if the two airships are experiencing countervailing winds with respect to each other (as indicated with an exemplary cartoon on the left-hand side of the figure and the legend "Countervailing Winds At Airships"), or if the two airships are experiencing wind in the same direction, with the aggregate drag on the tether operating in the opposite direction (indicated with an exemplary cartoon on the right-hand side of the figure and the legend "Countervailing on Tether"). It is noted that, in one embodiment, the algorithm that selects the pair of operating altitudes could attempt to avoid cases where the two airships experience wind in the same direction, countered only by tether drag. Limited simulations indicate that these cases tend to result in higher required propulsion forces. But there may be times when the situation is unavoidable, or where it leads to a slightly lower propulsion cost. Therefore, it is useful to consider both cases.

If the airships are experiencing countervailing wind (left-hand side of FIG. 7), the general philosophy for this stationkeeping algorithm is to first add lift (upward or downward as needed) for the "high drag" airship, and then add lift and drag at the other airship to zero the net lateral and vertical forces acting on the entire system. Ideally, after assigning tether drag to one airship or the other, both airships are flown with an aggregate or effective lift/drag (L/D) ratio of 1, with the drag forces and therefore the lift forces equalized, and stationkeeping is achieved with the airships separated horizontally by roughly the same distance as they are separated vertically.

At step 710, the net drag on the tether is assigned to the airship with drag operating in the same direction, and the magnitude of the drag on the two airships is compared (including the tether drag so assigned). The "highest drag" airship is identified. Clearly, drag must be increased on the other airship, but in order to keep the tether relatively vertical so as to avoid excessive tether length, the "high drag" airship may also need some additional lift in an upward or downward direction (depending on whether it is the upper or lower airship, respectively). The illustrated algorithm assumes that lift will always be added in order to match the (aggregate) drag. But adding lift may also increase drag, and this must be accommodated in the algorithm.

In step 715, the angle of attack of the "high drag" airship and/or its associated parafoil are adjusted to fly the combination at a combined Lift/Drag (L/D) ratio of 1, considering the baseline drag previously calculated (possibly including the tether) and any adjustments needed to account for drag on the parafoil and airship (i.e., when it/they is/are flying at a non-zero AoA). In general, since this is the high drag airship, lift should be added in a way which minimizes the incremental drag force. This could be the parafoil alone, the airship AoA alone, or a combination, depending on the geometry and performance capabilities of the system.

If the "high drag" airship is the lower airship, it should be understood that the desired lift is downward—angles of attack will be negative and the lift force will be directed toward the earth. The necessary lift force can be achieved by flying the airship at a negative angle of attack, or flying, the parafoil at a negative angle of attack, or both. Lift tends to be a linear function of AoA whereas drag tends to be a quadratic function of AoA, and as noted previously, the functional relationships are assumed to be known. Thus, the algorithm can calculate the necessary angles of attack to achieve an overall L/D ratio of 1. This L/D ratio is selected to keep the average tether angle above 45 degrees (i.e., substantially vertical) so as to avoid excessive tether length in the system. Other values could be selected or applied.

It should be noted that a soft or semi-rigid parafoil may be ineffective at achieving very low values of lift, for example if the needed AoA causes the parafoil to collapse or fail to inflate. In this case, the needed lift can be generated by adjusting airship AoA alone. The limitation associated with soft or semi-rigid parafoils could potentially be overcome by using a rigid wing instead of a parafoil. A rigid wing could operate over a wider range of angles of attack, including significant "negative angles" relative to its normal orientation. This would allow the wing to operate at zero lift (although this is dynamically unstable and therefore requires a rapid control loop), and would also allow a single wing to achieve both upward as well as downward lift. This might have other advantages, such as the ability to operate the wing to generate power. However, a rigid wing might be heavier than a parafoil, and the advantages and disadvantages for overall system cost and performance would need to be assessed.

In order to support the later stages of the algorithm, step 715 also calculates the new effective value of total drag due to the airship (including the tether, if it was part of the baseline drag found in step 710) and airfoil.

In step 720, attention shifts to the "low drag airship" airship. Upward or downward lift is added, using airship AoA or parafoil AoA or both, to compensate for the lift associated with the "high drag airship" including its parafoil. Additional drag forces are calculated (now operating to counter the overall drag experienced in the system), and the new value of total drag (net drag) is calculated. It will be appreciated that the airship and airfoil have different aerodynamic characteristics, and so a given amount of lift can be achieved with differing amounts of drag. Ideally, the necessary amount of lift is achieved while coming close to compensating, but not exceeding, the effective value of total drag calculated previously in step 715.

In step 725, the aperture of the parachute associated with the "low drag airship" is then adjusted to add drag as needed to counter the remaining drag force operating on the system. Vernier adjustments to zero-out any east-west drift, experienced over time, can be achieved by adjusting the aperture (or equivalent drag profile) of one or both of the parachutes in the system.

In a practical system, the airships and parafoils can only be operated over a finite range of angles of attack, and the parachutes are limited in terms of maximum aperture (or maximum drag, if aperture is fixed and the parachute employs a system of vents to adjust drag forces). In executing the algorithm, "bounds checking" should be used to stay within these limits. At step 730, a check is performed to see if the adjustments actually resulted in a reduction in overall propulsive force needed to maintain station. In general, if the winds were countervailing but wind at one altitude was exceedingly weak compared to the other, the algorithm might be ineffective since the initial adjustment of lift to equal drag at the "high drag" airship cannot be compensated at the other airship, even at the maximum AoA and parachute aperture or drag allowed, since that low drag airship is experiencing very weak wind. In these cases, the system could instead rely on the propulsion system alone (step 735).

Now consider the case where both airships experience a wind in the same direction, but the winds experienced by the tether result in an aggregate drag force (on the tether) in the opposite direction. This case is handled in the right-hand side of FIG. 7. Two sub-cases must be considered (step 740). In the first sub-case, the overall drift direction of the system is in the same direction as the winds experienced by the airships. In this case, the system is already drifting in the direction of both airships, and neither airship can apply additional drag to counter this drift. So only propulsion can be used (step 743). In the second sub-case, the overall drift direction of the system is in the same direction as the net drag force experienced by the tether. In this case, the system is drifting in the direction of the tether and the airships can add lift and drag to counter this drift as described below (steps 750 through 765).

It may be noted that, unlike the case considered in steps 710 through 735, the tether drag is not aligned with (in the same direction as) the wind or drag force experienced by either airship. Therefore, the tether drag is not applied to either airship.

At step 750, lift in an upward and downward direction is added by adjusting airship and parafoil AoA for both the upper and lower airship. This is primarily intended to keep the tether in a substantially vertical orientation. In one embodiment of this algorithm, lift is first calculated/applied at the "low drag airship" with the intent of adding a magnitude of lift that is as large as, but no larger than, the aggregate (net) drag force experienced by the tether. Lift is then added at the "high drag airship" to compensate and ensure no net vertical motion. These lift forces, in an upward and downward direction, will tend to keep the tether relatively vertical. However, the amount of lift added is constrained by several factors. First, due to low wind speed at the "low drag airship", the maximum amount of lift achievable at this airship is limited. Second, the generation of lift at each airship, whether by parafoil or airship, generates additional drag. Care should be exercised to avoid generating so much drag that the system starts to drift in the other direction at a high rate (this net drift, in the same direction as the wind experienced by the airships, can only be compensated with propulsion).

The amount of additional drag, associated with the application of lift, is calculated as part of step 750.

At step 755, if the system is still drifting in the direction of the tether, drag can be added at one or both of the airships in order to compensate and achieve zero drift rate (if within the capabilities of the system).

A performance check is executed at step 760 to verify that overall performance (net drift) has been reduced. If the system cannot compensate for all forces using passive techniques (i.e., airship AoA, parafoil, and parachute), propulsion can be added as needed (step 765).

This algorithm assumes only east-west (zonal) wind. A net north-south drift, for the tethered airship, can be compensated by adjusting the bank angle of one or both of the parafoils (or the heading angle of one or both of the airships relative to the local wind field) and making compensating vernier adjustments for overall lift and drag.

Those of skill will appreciate that the algorithm described here can be augmented to consider altitude changes, if the winds at various altitudes are known with precision or even with a degree of uncertainty. Also, the algorithm can be augmented to accommodate airships with variable geometry, and parafoils with variable geometry, as tong as the lift and drag can be measured or calculated.

Figure 8A:
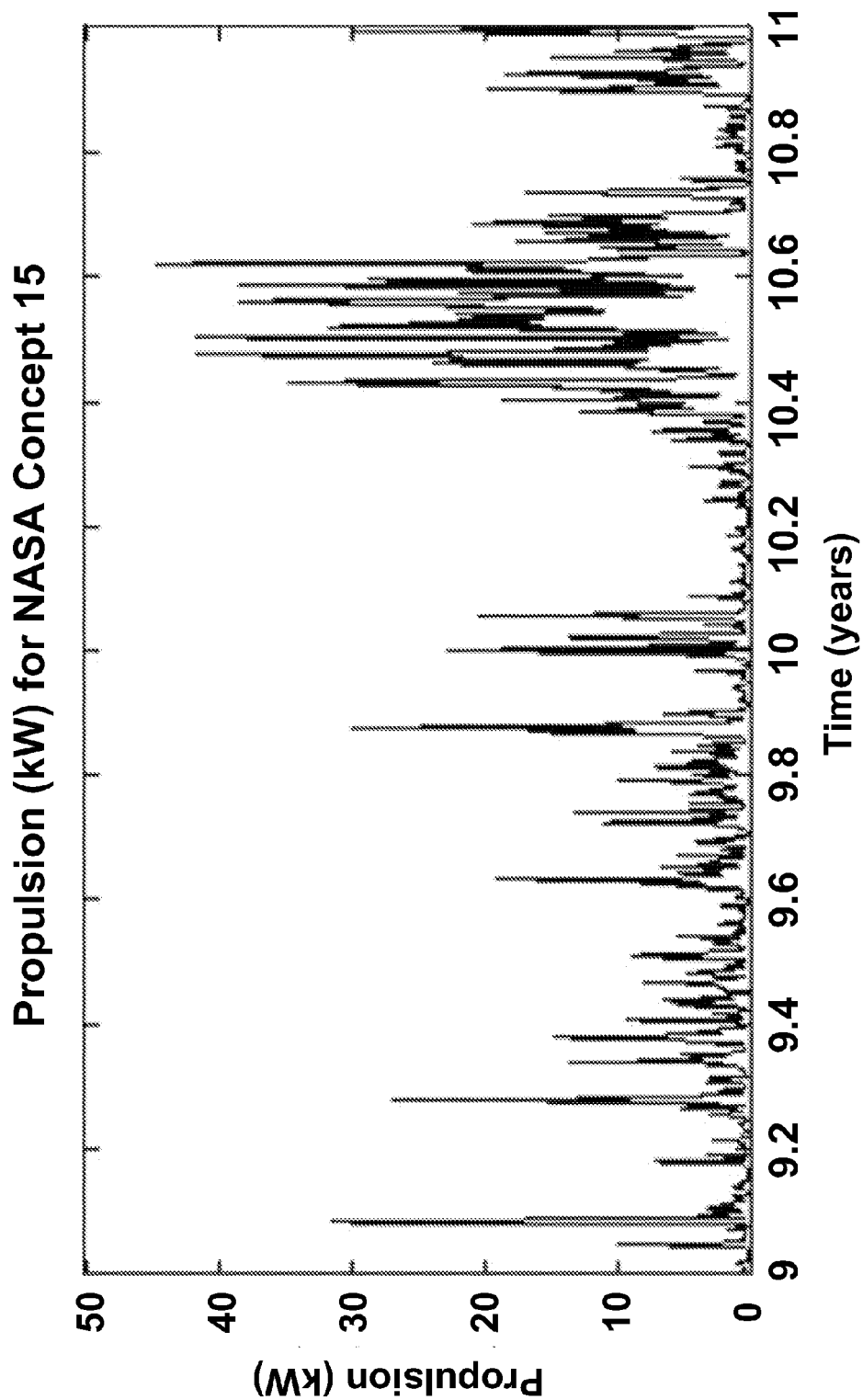
FIGS. 8A-8B are graphs showing propulsion power consumption for a traditional airship and a tethered airship system, according to one example of principles described herein.
Figure 8B:
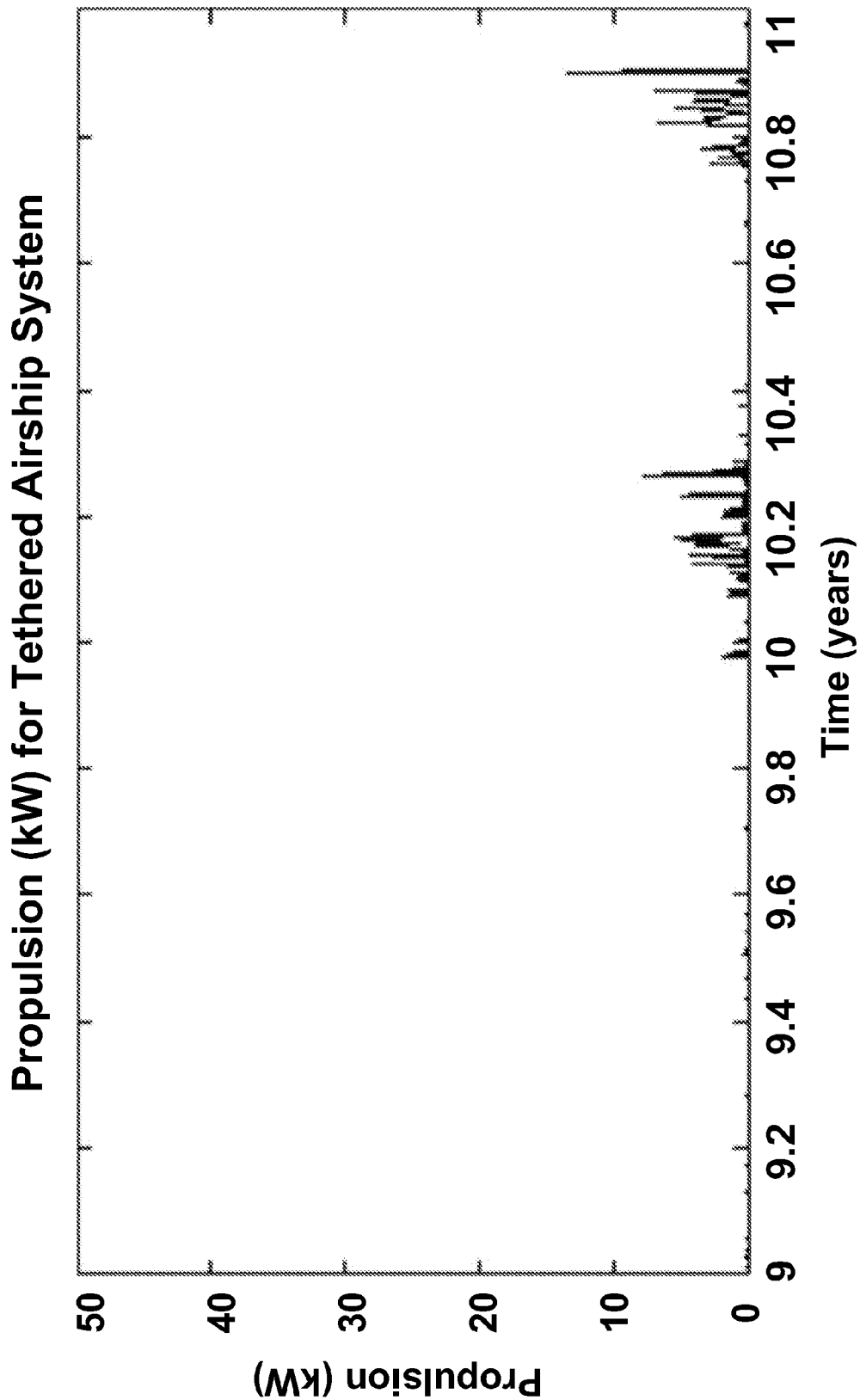

One example of the efficacy of these methods is illustrated in FIGS. 8A-8B. These figures show the comparative propulsion requirement for east-west stationkeeping, kilowatts, between a traditional airship and a tethered airship using the present invention. The wind data is taken from the NASA/MERRA dataset which is publicly available. The wind field is represented at 6 hour intervals over the two-year simulation period from Jan. 1, 2009 through Dec. 31, 2010 (note: only the east-west component of the wind was considered for this simulation; the north-south component is typically much smaller, and would be compensated by e.g. heading adjustments for the airships or bank angle adjustments on the parafoils). The simulated stationkeeping location is at 0N, 60E.

The traditional airship is modeled on a concept developed by NASA/LaRC 2007 and documented in NASA/TP-2007-214861 (see specifically Concept 15 with parameters tabulated in Table 29 of that publication). This is a relatively large airship (approximately 140 m long; 40 m diameter; 116,400 $m^3$ lifting volume) adapted for a communications relay mission. For this simulation, it is assumed to be operated at an altitude of 19 km. Its propulsion requirement for stationkeeping as a function of time is illustrated by the graph in FIG. 8A.

A tethered airship system that includes an upper airship tethered to a lower airship, with the tower airship also flown at 19 km, was also simulated. Its propulsion requirement is illustrated in the graph in FIG. 8B. The lower airship was assumed to have a combined lifting volume of 50,000 $M^3$, considering a lower logistics airship and a mated payload airship carrying the same payload as the traditional airship, with an effective volumetric drag coefficient for the mated pair of 0.05. The upper airship was assumed to have a lifting volume of 700,000 $m^3$ with volumetric drag coefficient of 0.03 (roughly the same drag coefficient as the traditional NASA airship). Each airship in the tethered airship system was assumed to also comprise a parafoil and parachute, and be able to adjust its own angle of attack. Each airship AoA could be adjusted over ±20 degrees with an additional impact on its drag coefficient (i.e., above the baseline value assumed) of $0.0004*AoA^2$. Each airship lift coefficient was modeled as $0.0175*AoA$. Parachutes were modeled as having variable aperture with a maximum aperture of 50 m diameter and a drag coefficient of 1.5. Parafoils were modeled as rectangular, 50 m×12.5 m, with maximum AoA=12 degrees, lift coefficient=0.35+0.0375 AoA, and drag coefficient=0.14-+ $0.0002*AoA^2$. It should be noted that, for the tower airship and its associated parafoil, the applied angles of attack and "lift forces" are in a downward direction.

The upper airship was flown at altitudes between 25 and 37 km. For each 6 hour time interval over the simulation time period, an upper airship altitude was selected from within this range to ensure countervailing winds at the two airships (whenever possible), and secondarily to minimize the nominal drag on the two airships plus the tether. Once the altitude for the upper airship was selected, airship AoA, parafoil AoA, and parachute aperture size were adjusted for both airships, using the methods outlined in FIG. 7, to further minimize drag and provide for dynamic lift to keep the tether substantially vertical. It should be noted that changes in the altitude of the upper airship could also result in small changes in the altitude of the lower airship, if not actively managed, but the simulation assumed that the lower airship was always flown at 19 km.

As will be appreciated by those of skill in the art, the design and performance assumptions used above are "exemplary simplifications" intended to capture sufficient fidelity to make a meaningful high-level comparison between alternatives, and are not intended to represent a preferred embodiment. Nevertheless, the simulation results are dramatic and suggest that a tethered airship, embodying the concepts described herein, can significantly out-perform a traditional airship in terms of stationkeeping energy efficiency.

The residual propulsion requirement for the tethered airship system, after compensation, is shown in the graph in FIG. 8B. As may be seen, the peak propulsion requirement is reduced by about a factor of 5 compared to the traditional airship. More precisely, the propulsion requirement over the simulated time interval was less than 20% of the peak requirement for the traditional airship over 99.97% of the sample time points. For the remaining (single) time point, it was roughly 33% of the peak requirement for the traditional airship. Also, while not immediately apparent from this time history, the average propulsion requirement was reduced by about a factor of 20.

In general, only insignificant amounts of propulsion were needed by the tethered airship system except when the winds were light and irregular. Thus, for periods when the Concept 15 based airship had high thrust requirements for station keeping, the tethered airship system did not require significant propulsion. In many cases, including the worst-case wind events represented by the peaks experienced by the traditional airship during calendar year 2010 (i.e., between 10.4 and 10.7 on the horizontal axis), the tethered airship system requires no (or almost no) auxiliary propulsion. These reductions in propulsion load are significant, and result in substantial reductions in subsystem weights for energy storage, energy conversion, and propulsion, as well as a reduction in overall size of the lower airship (thereby enabling the smaller airship size assumed for the simulation).

If the lift and drag on the various elements of the system can only be approximately calculated, there may be a small residual drift in the eastward or westward direction. This can be accommodated by vernier adjustment of the parachute apertures or vents. These vernier adjustments can also be used to account for variations and uncertainty in tether drag.

The simulation results for the tethered airship, shown in FIG. 8B, assumed that an optimum altitude for the upper airship was selected at each time point to ensure countervailing winds at the two airships (whenever possible), and secondarily to minimize the nominal drag on the two airships plus the tether prior to further compensation with airship AoA, parafoil AoA, and parachute drag). This is a good heuristic approach that typically results in very low propulsion requirements, although they are not guaranteed to be the absolute minimum. Other algorithms are feasible and could be explored to further reduce the peak and average propulsion requirements of the system. For example, instead of selecting a nominal attitude based on minimum drag in an uncompensated state, each altitude could be examined to determine its optimum stationkeeping configuration, and all of these alternatives could be examined to select the one with the lowest propulsion cost. This would involve more computation, but might result in improved performance.

One operational penalty, associated with the two algorithms described above, is a large number of altitude transitions over the course of a simulated mission. Potentially, each timestep in the simulation (equivalent to a new set of weather data in an operational system) could result in an altitude transition. Each downward transition involves the application of work to "reel in" the upper airship against the force represented by its natural buoyancy as well as any dynamic lift applied, and both upward and downward transitions contribute to wear and tear on the tether, and require careful management of internal airship pressures. As a consequence, many operational systems will seek to minimize the number of altitude transitions executed over time. This will tend to increase the amount of propulsion required, since altitudes are no longer selected with a single goal of minimizing this parameter. However, in many cases the penalty will not be severe.

Figure 9:
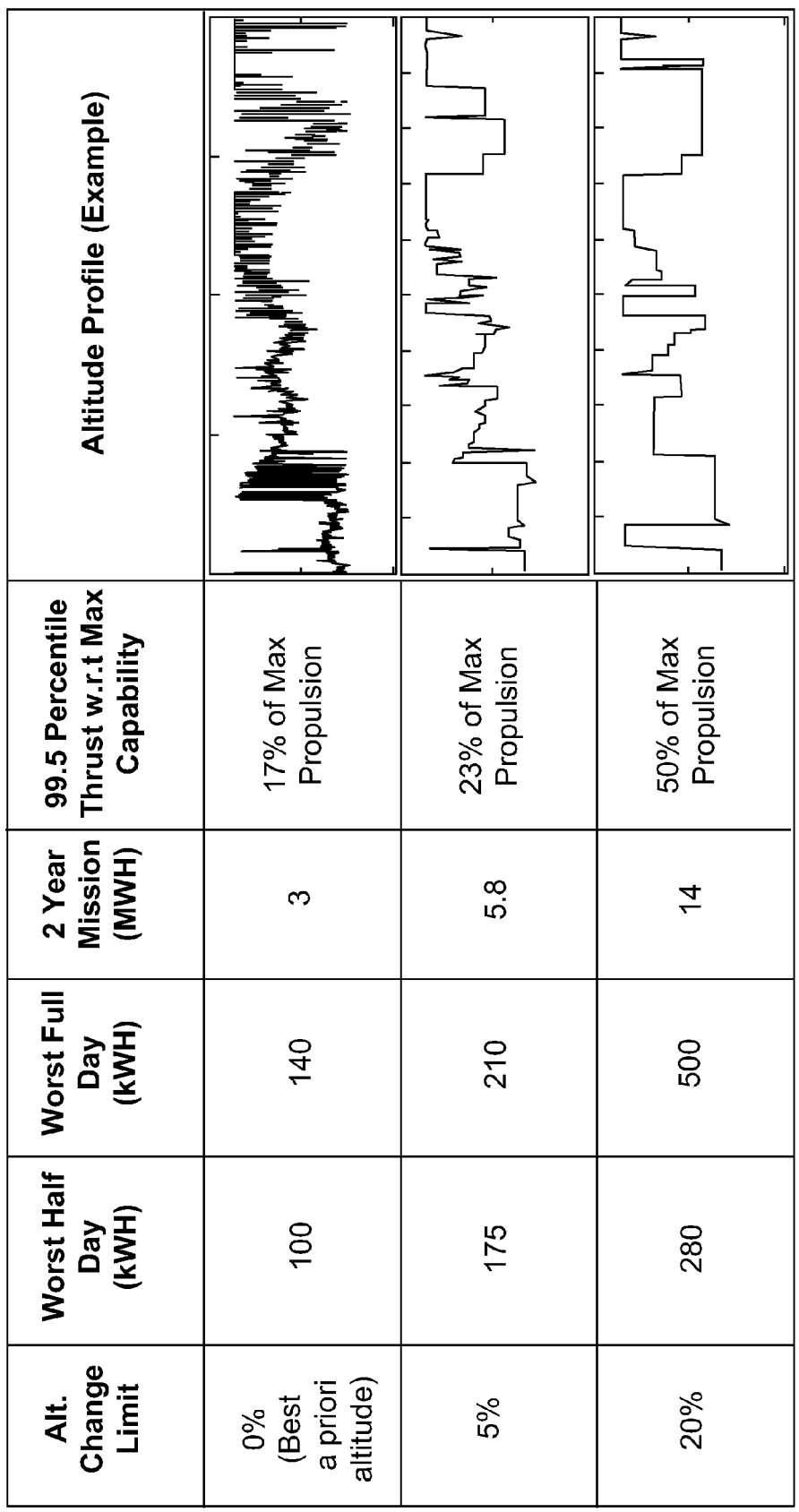
FIG. 9 is a table that shows three cases to demonstrate the reduction in altitude transitions that can be achieved with a relaxation of a propulsion optimization objective, according to one example of principles described herein.

FIG. 9 is a table that shows three cases, purely by way of example, to demonstrate the reduction in altitude transitions that can be achieved with a relaxation of the propulsion optimization objective. The first column of the graph describes one illustrative criterion for making an altitude change. The values listed in the first column are percentages of total achievable thrust used in the previous time step. If the percentage of thrust used in the previous time step exceeded the listed percentage of total achievable thrust, the altitude of the upper airship was changed. If the percentage of thrust used in the previous time step was less than the listed percentage of total achievable thrust, no change in altitude was made.

The second column reports the largest amount of power consumed (in kilowatt hours) in any 12 hour period using the criteria in the first column. The third column reports the largest amount of power used (in kilowatt hours any 24 hour period using the altitude change criteria in the first column. The second and third columns can be used to estimate the sizes for propulsion engines and, if solar power is being used, to size the solar panel array.

The fourth column reports the total amount of power consumed over a two year mission in megawatt hours. The fourth column can be used to estimate a total amount of fuel/energy needed over the two year mission. This energy would have to stored, delivered, or captured over the two year mission.

The fifth column describes 99.5 percentile thrust with respect to maximum thrust capability. The data for the three simulations is reported as a percentage of the maximum thrust produced by the system. In this simulation, the maximum available thrust results in motion of the lower airship at an airspeed of 20 meters per second in a minimum-drag configuration, if it is not encumbered by any other elements. The tethered airship system as a whole can maintain stationkeeping 99.5% of the time using the reported percentage of its total thrust capability.

The last column shows illustrative graphs of the altitude changes made as a result the criteria listed in the first column, the airship system described above and the wind data described above over a two year time period. Each of the illustrative graphs has time on the horizontal axis and attitude of the upper airship on the vertical axis. Vertical lines in the traces on the charts represent altitude changes. Horizontal lines in the traces represent holding an altitude.

The top row in the table is the baseline already described above, where a (potentially) new altitude is selected at every time step. The propulsive load, for a worst "half-day" (i.e., potentially a night-time period), worst full day, and a full two-year mission, is tabulated along with an illustrative trace showing the altitude transitions for the upper airship. As may be seen, propulsion requirements are low but non-zero. For the simulated scenario, station-keeping could be performed for 99.5% of all time points while "exercising" the propulsion system to only 17% of its full capability (in this case, as noted above, full capability was defined as 20 m/s airspeed for the lower airship considered alone). Also as may be seen from the large number of vertical lines in the trace in the upper chart, a large number of altitude transitions were commanded.

The second row uses the same optimization methods, but applies a simple heuristic that prevents any altitude change when the propulsion load in the previous time step was less than 5% of the maximum propulsion capability in the system. As may be expected, this leads to an increase in the typical and worst-case propulsive loads on the system. But the difference is less than a factor of 2:1 and there is a dramatic reduction in the number of altitude transitions over time, as indicated by the trace in the right-hand chart of the middle row.

The third row illustrates the effect (for this scenario) of blocking any altitude change when the propulsion load in the previous time step is less than 20% of the maximum propulsion capability in the system. This results in a further increase in propulsive load along with a further reduction in the number of altitude transitions commanded by the system.

In summary, in the first scenario the optimum altitude was always sought. This resulted in lower energy requirements and potentially a smaller required propulsion unit. However, the altitude changed frequently, potentially resulting in increased wear on the winching and tether system. For more relaxed approaches (rows 2 and 3) to making altitude decisions, the energy and propulsion requirements increased but the number of times the altitude changed was drastically reduced. Thus, it is possible to trade-off lateral propulsion loads against vertical altitude transitions in order to satisfy a variety of possible operating strategies and constraints.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for stationkeeping of a free-flying tethered airship system comprising:
   determining wind direction on a lower airship, an upper airship, and a tether connecting the lower airship and the upper airship; and
   reconfiguring the free-flying tethered airship system to reduce a net force on the free-flying tethered airship system.

2. The method of claim 1, in which reconfiguring the free-flying tethered airship system to reduce the net force on the free-flying tethered airship system comprises:
   when winds at the lower airship, the upper airship and the tether are all in a same direction, using propulsion for stationkeeping;

when winds are countervailing on the tether relative to the winds at both of the airships, and the magnitude of the net drag force on the tether exceeds the magnitude of the combined drag force on the airships, increasing the drag on at least one of the airships or changing an altitude of at least one of the airships; and when winds are countervailing at the airships, altering the configuration of at least one of the lower airship and the upper airship to balance drag forces on the free-flying tethered airship system.

3. The method of claim 1, wherein reconfiguration of the free-flying tethered airship system comprises deploying, or altering a deployed configuration of, a deflection surface integrated with the airship.

4. The method of claim 3, wherein the deflection surface creates a duct between the deflection surface and an outer hull surface of the airship.

5. The method of claim 1, further comprising operation of a gas separator onboard at least one of the lower airship and the upper airship to recover lifting gas that has escaped from a gas envelope.

6. The method of claim 1, wherein reconfiguring the free-flying tethered airship system to reduce a net force on the free-flying tethered airship system comprises controlling at least two distinct and non-continuous lifting surfaces suspended below an airship.

7. The method of claim 1, wherein reconfiguring the free-flying tethered airship system to reduce a net force on the free-flying tethered airship system comprises adjusting a plurality of tension members connected to an outer hull of one of the upper airship or lower airship to change a geometry of the outer hull.

8. The method of claim 1, wherein reconfiguring the free-flying tethered airship system to reduce a net force on the free-flying tethered airship system comprises recovering lifting gas from a space between an outer hull and an inner ballonet and injecting the recovered lifting gas back into an inner ballonet.

9. The method of claim 1, wherein reconfiguring the free-flying tethered airship system to reduce a net force on the free-flying tethered airship system comprises transferring lifting gas from a first lifting cell of an airship to a second lifting cell of an airship, wherein internal cells are defined by single wall bulkheads, with the first lifting cell and the second lifting cell sharing a common single wall bulkhead.

10. The method of claim 1, wherein reconfiguring the free-flying tethered airship system comprises:
    determining that a change in altitude would reduce a net force on the free-flying airship;
    applying a threshold criterion to determine if an altitude change will be made; and
    changing an altitude of at least one of the lower airship or upper airship when the threshold criterion is met.

11. The method of claim 10, wherein the threshold criterion comprises a percentage of total available propulsive thrust used by the free-flying tethered airship system in a past time period.

* * * * *